(12) United States Patent
Cheng et al.

(10) Patent No.: US 10,699,746 B2
(45) Date of Patent: Jun. 30, 2020

(54) CONTROL VIDEO PLAYBACK SPEED BASED ON USER INTERACTION

(71) Applicant: Microsoft Technology Licensing, LLC, Redmond, WA (US)

(72) Inventors: Shirui Cheng, Lund (SE); To Tran, Arlöv (SE); Lukasz Spas, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 15/584,298

(22) Filed: May 2, 2017

(65) Prior Publication Data
US 2018/0322905 A1  Nov. 8, 2018

(51) Int. Cl.
*G11B 27/00* (2006.01)
*G11B 27/34* (2006.01)
*G11B 27/036* (2006.01)
*H04N 21/472* (2011.01)

(52) U.S. Cl.
CPC .......... *G11B 27/005* (2013.01); *G11B 27/036* (2013.01); *G11B 27/34* (2013.01); *H04N 21/47202* (2013.01); *H04N 21/47205* (2013.01)

(58) Field of Classification Search
CPC ..... G11B 27/005; G11B 27/036; G11B 27/34; H04N 21/47202; H04N 21/47205
See application file for complete search history.

(56) References Cited

U.S. PATENT DOCUMENTS

| | | | |
|---|---|---|---|
| 8,166,388 B2 | 4/2012 | Gounares et al. | |
| 8,930,843 B2 | 1/2015 | Mangini et al. | |
| 9,046,999 B1 | 6/2015 | Teller et al. | |
| 9,098,503 B1 | 8/2015 | Johnson et al. | |
| 9,516,255 B2 | 12/2016 | Lee et al. | |
| 9,753,626 B2 * | 9/2017 | Yang | G06F 3/04845 |

(Continued)

FOREIGN PATENT DOCUMENTS

| CN | 106937152 A | * 7/2017 | .......... H04N 21/422 |
|---|---|---|---|
| WO | 1999046702 A1 | 9/1999 | |

(Continued)

OTHER PUBLICATIONS

Pimentel, et al., "Enhancing Multimodal Annotations with Pen-Based Information", In Proceedings of Ninth IEEE International Symposium on Multimedia Workshops, Dec. 10, 2007, pp. 207-212.

(Continued)

*Primary Examiner* — Mishawn N. Hunter

(57) ABSTRACT

Examples of the present disclosure describe systems and methods for controlling video playback speed using user interaction. In aspects, user input may be detected during an aspect of video playback. The user input may correspond to, for example, adding user notes or drawings using one or more input devices (e.g., a stylus, a finger, etc.) to a video being played back. A set of features of the interaction may be determined using one or more sensors. Based on the determined features, a video playback speed may be determined and applied to the video. The video may be played at the determined video playback speed for the duration of the detected user input. When the user input is no longer detected, the video playback may automatically resume at the normal playback speed.

20 Claims, 8 Drawing Sheets

(56) References Cited

U.S. PATENT DOCUMENTS

| | | |
|---|---|---|
| 2009/0174677 A1 | 7/2009 | Gehani et al. |
| 2009/0304089 A1* | 12/2009 | Seki .................. H04N 19/172 375/240.25 |
| 2011/0040981 A1* | 2/2011 | Lindahl ................ H04H 20/40 713/189 |
| 2012/0030636 A1* | 2/2012 | Miyazaki ............. G06F 3/0488 715/863 |
| 2012/0079420 A1* | 3/2012 | Arriola ................ G06F 3/0482 715/784 |
| 2012/0306766 A1* | 12/2012 | Moore ............... G06F 3/04883 345/173 |
| 2013/0031266 A1* | 1/2013 | Gilson ................ G11B 27/005 709/232 |
| 2015/0067513 A1* | 3/2015 | Zambetti ............. G06F 3/0482 715/716 |
| 2015/0185840 A1* | 7/2015 | Golyshko ........... G06F 3/04842 715/702 |
| 2015/0192989 A1* | 7/2015 | Kim ...................... G06F 3/011 345/156 |
| 2016/0139794 A1 | 5/2016 | Hammendorp et al. |
| 2016/0253087 A1* | 9/2016 | Moon ................... G06F 3/041 715/720 |
| 2016/0259412 A1* | 9/2016 | Flint .................... G06F 3/0488 |
| 2017/0024110 A1* | 1/2017 | Xu ..................... G06F 3/04817 |
| 2017/0249970 A1* | 8/2017 | Loganathan ......... G11B 27/031 |
| 2018/0052560 A1* | 2/2018 | Kang ................... G06F 3/0416 |
| 2018/0070043 A1* | 3/2018 | Kim .................... G06F 3/04845 |
| 2018/0074688 A1* | 3/2018 | Cheng ................ G06F 3/04847 |

FOREIGN PATENT DOCUMENTS

| | | |
|---|---|---|
| WO | 2012094479 A1 | 7/2012 |
| WO | 2014072567 A1 | 5/2014 |

OTHER PUBLICATIONS

Cabral, et al., "Pen-based Video Annotations: a proposal and a prototype for Tablet PCs", In Proceedings of 12th IFIP TC 13 International Conference on Human-Computer Interaction, Aug. 24, 2009, 4 pages.

Cabral, et al., "Videoink: a pen-based approach for video editing", In Adjunct Proceedings of the 25th Annual ACM Symposium on User Interface Software and Technology, Oct. 7, 2012, pp. 67-68.

Wick, Stefan, "Annotating Video with Ink using Silverlight", https://blogs.msdn.microsoft.com/swick/2007/11/15/annotating-video-with-ink-using-silverlight/, Published on: Nov. 15, 2007, 4 pages.

"Help Documents and User Guides", https://doceri.com/support/knowledgebase.php?article=26, Published on: Jul. 23, 2012, 4 pages.

"International Search Report and Written Opinion Issued in PCT Application No. PCT/US2018/028754", dated Jul. 10, 2018, 12 Pages.

* cited by examiner

CONTROL VIDEO PLAYBACK SPEED BASED ON USER INTERACTION

BACKGROUND

Generally speaking, video editing is the process of manipulating and rearranging content in a video stream or in one or more video images. With respect to video editing during video playback, there are generally two approaches. The first approach requires the editing user to edit the video being played back in real-time or in normal playback speed. The second approach requires the editing user to pause the video being played back. The editing user may then edit the paused video frame. The first approach often fails to provide sufficient time for the editing user to make edits and provide adequate explanation, while the second approach results in a choppy, potentially jarring, playback experience for viewers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for controlling video playback speed using user interaction. In aspects, user input may be detected during an aspect of video playback. The user input may correspond to, for example, adding user notes or drawings using one or more input devices (e.g., a stylus, a finger, etc.) to a video being played back. A set of features of the interaction may be determined using one or more sensors. Based on the determined features, a video playback speed may be determined and applied to the video. The video may be played at the determined video playback speed for the duration of the detected user input. When the user input is no longer detected, the video playback may automatically resume at the normal playback speed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
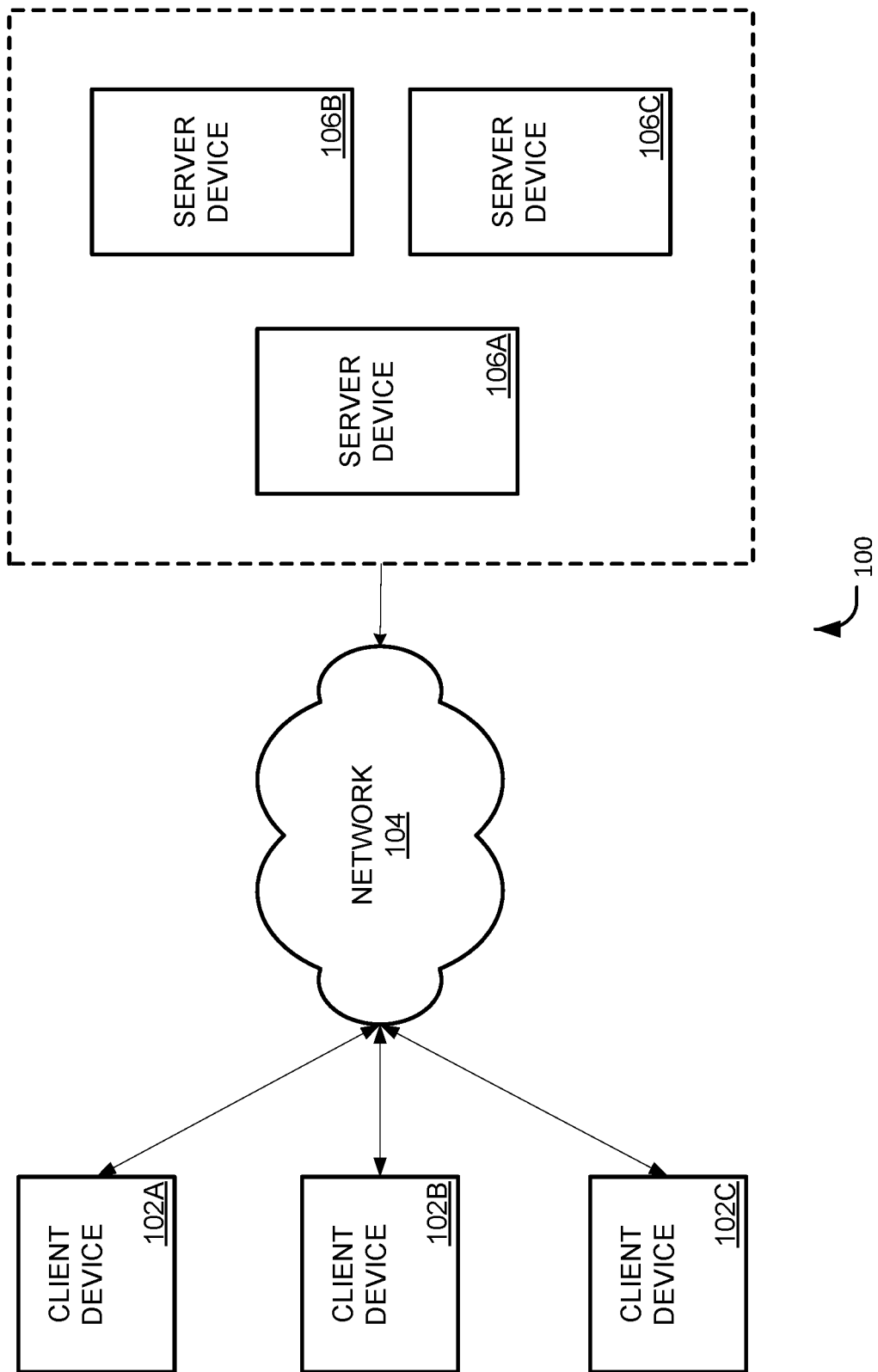
FIG. 1 illustrates an overview of an example system for controlling video playback speed using user interaction as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for controlling video playback speed using user interaction. In aspects, a video may be played or executed using a video playback utility/service. The video and/or the video playback utility/service may be associated with a playback speed setting or value. The default playback speed setting or value may correspond to the normal or expected playback speed in the video. In examples, a video may be played at the default playback speed on or using the display/screen of a display device. In some examples, the display/screen of the display device may be configured to receive input via one or more touch-based input methods (e.g., a stylus, a finger, etc.). In other examples, the display device may be configured to receive input via one or more input devices (e.g., a mouse, a keyboard, a microphone, etc.). In aspects, the video and/or the video playback utility may be operable to receive and detect input during an aspect of video playback. Detecting the input may include using one or more sensors available to the display device. Examples of sensors may include a proximity sensor, an accelerometer sensor, a gyroscopic sensor, a force sensor, an acoustic sensor, a touch screen sensor, an optical sensor, and a localization sensor. One of skill in the art will appreciate that other types of sensors may also be used. The detected input may correspond to user input received via the one or more of the input methods/devices described above. Upon detecting the input, a set of features corresponding to the input may be determined. Based on the determined set of features, a modified video playback speed may be determined and applied to the video. In one example, determining the modified video playback speed may include using one or more rules sets or machine-learning techniques. The video may be played at the modified video playback speed for the duration of the detected user input. When the user input is no longer detected, the video playback may automatically resume at the normal playback speed.

Accordingly, the present disclosure provides a plurality of technical benefits including but not limited to: detecting user interaction during video playback, calculating an adjusted video playback speed based on user interaction features, altering the playback speed of a video based on the determined set of features while the user interaction is detected, resuming the default playback speed of a video when the user interaction is no longer detected, enhancing the user experience, among other examples.

FIG. 1 illustrates an overview of an example system for creating a conversational chat bot of a specific person as described herein. Example system 100 may be a combination of interdependent components that interact to form an integrated whole for performing task management. In aspects, system 100 may include hardware components (e.g., used to execute/run an operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 4-7. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to implement a video playback utility or service. Alternately, the video playback utility or service may be implemented on one or more of server devices 106A-C, and be accessible to client devices 102A-C via network 104. The video playback utility or service may be configured to play/execute videos and other media content on a display screen or user interface accessible to client devices 102A-C. The video playback utility or service may also comprise a settings menu for viewing and modifying one or more media attributes and/or media playback attributes. Examples of media attributes include metadata (e.g., title, artist, genre, rating, description, encoding parameters, duration, track number, etc.), frequency, amplitude, phase, variance, video frame size, video frame rate, aspect ratio, audio bit rate, audio sample rate, number of channels, channel mappings, character counts, language, font data, image width and height, samples per pixel, digital rights management (DRM) properties, etc. Examples of media playback attributes include volume, bass, treble, brightness, hue, saturation, contrast, zoom effects, play order, captions/subtitles, annotations, graphic equalization, play speed, visualization effects, crossfading, auto-volume leveling, accessory modes, video resolution, audio style, auto-play, preferred playback application/service, etc. Client devices 102A-C may present the playback/execution of media content at a default playback speed on the display screen/user interface.

Client devices 102A-C may be further configured to receive input during the playback of media content. In aspects, client devices 102A-C may receive input from a user via a user interface component or other input means, such as device sensors. Examples of input may include voice, visual, touch and text input. Client devices 102A-C may analyze the received input data/sensor data to determine a set of features and/or corresponding values for the input. The analysis may include constructing one or more feature vectors representing the input data. For example, features and/or metadata may be extracted from the input data/sensor data and represented as numeric values. One or more of the numeric values may be inserted into to a feature vector. In examples, the features may relate to screen pressure, resistance or capacitance, writing/drawing speed, the area of the screen receiving the input, distance between an input device and the screen, the input device(s) providing the input, duration of time input is received, etc. Client devices 102A-C may apply the set of features and values to one or more logic sets, such as a rule sets, an algorithm, or a model/modelling utility. A model, as used herein, may refer to a predictive or statistical language model that may be used to determine a probability distribution over one or more word, character sequences or events, and/or to predict a response value from one or more predictors. In examples, a model may be a rule-based model, a machine-learning regression model, a machine-learning classifier, a neural network, or the like. In examples, the logic set may produce output determining, or used to determine, an adjusted video playback speed or value for the media content being played. Client devices 102A-C may apply the adjusted video playback speed of the playback of the media content. As a result, the default playback speed of the media content being played may be modified to, or in accordance with, the adjusted video playback speed/value. In aspects, client devices 102A-C may continue to apply the adjusted video playback speed/value to the playback of the media content while input continues to be received from the user.

Client devices 102A-C may be further configured to readjust the playback speed of media content to a default value. In aspects, client devices 102A-C may detect a modification to the features of the input received during the playback of the media content. In some examples, the modification may correspond to a change to the input type, speed, pressure, style, content, etc. The modified input features and values may be provided to one or more logic sets and used to further adjust the video playback speed/value of the playback of the media content, as described above. In other examples, the modification may correspond to the cessation of user input for at least a threshold period of time. In such examples, client devices 102A-C may set or readjust the adjusted video playback speed/value of the playback of the media content to a default video playback speed/value. As a result, the playback speed of the media content being played may be automatically modified to, or in accordance with, the default video playback speed/value when user input is no longer detected during the playback.

Figure 2:
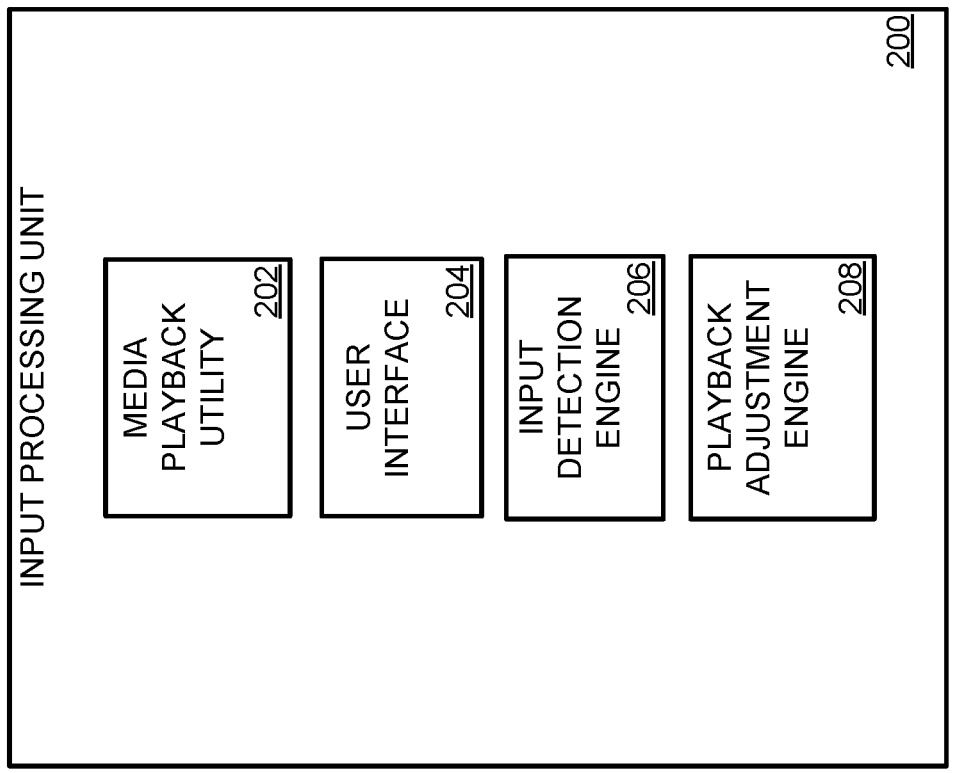
FIG. 2 illustrates an example input processing unit for controlling video playback speed using user interaction as described herein.

FIG. 2 illustrates an overview of an exemplary input processing unit 200 for controlling video playback speed using user interaction, as described herein. The video playback techniques implemented by input processing unit 200 may comprise the techniques and input described in FIG. 1. In alternative examples, a single system (comprising one or more components such as processor and/or memory) may perform the methods and processes described in systems 100 and 200, respectively.

With respect to FIG. 2, input processing unit 200 may comprise media playback utility 202, user interface 204, input detection engine 206, and playback adjustment engine 208. Media playback utility 202 may be configured to play and/or modify media content accessible to input processing unit 200. In aspects, media playback utility 202 may have access to one or more data sources (e.g., data stores, services, APIs, etc.) comprising/providing media content. Such data sources may be local or remote to input processing unit 200. Media playback utility 202 may comprise functionality for the playback and/or modification of the media content. Media playback utility 202 may also comprise settings relating to one or more media attributes and/or media playback attributes. For example, media playback utility 202 may comprise a media playback attribute specifying a default playback speed for specified media content (e.g., specific media items, types of media content, etc.). Accordingly, when the media playback utility 202 receives an instruction to play the specified media content, media playback utility 202 applies the default playback speed to the playback.

User interface 204 may be configured to enable a user to view and/or manipulate media content as it is played. In aspects, input processing unit 200 may present media content played by media playback utility 202 to a user via an interface, such as user interface 204. User interface 204 may enable user interaction with the media content as it is being played. The user interaction may correspond to receiving user input, modifying media content attributes, modifying media playback setting, and the like. In examples, such user input may include modifying the content of the playback using one or more input means (e.g., a touch screen, a mouse, a keyboard, a microphone, etc.). The modifications to the content may be represented by a set of input values corresponding to one or more input features or characteristics. The input from the user interaction (and the values associated therewith) may be stored by an input detection component, such as input detection engine 206.

Input detection engine 206 may be configured to detect and/or collect user input received during playback of media content. In aspects, input detection engine 206 may detect when user input is received as a result of user interaction with media content being played. Detecting user input may include monitoring one or more input channels, I/O files, and/or event monitors. As an example, one or more touch screen drivers associated with input detection engine 206 and/or input processing unit 200 may record data related to touch dynamics features, such as touch direction, touch pressure, input device, acceleration, touch period, touch frequency, etc. Such data may be recorded using numerical values, character strings or labels, and stored in one or more data stores accessible to input detection engine 206. Input detection engine 206 may monitor such data stores (and/or the communications thereto).

Playback adjustment engine 208 may be configured to calculate/determine adjustments to media playback attributes. In aspects, playback adjustment engine 208 may have access to the user input data collected during the playback of media content. Playback adjustment engine 208 may provide the user input data to one or more logic sets or logic systems (e.g., rule sets, an algorithm, a model/modelling utility, etc.). The logics sets/systems may use the user input data to calculate or determine adjustments to one or more media playback attributes, such as playback speed. For example, playback adjustment engine 208 may compare the user input data to a pressure-based mapping. The pressure-based mapping may comprise a mapping of pressure ranges to playback speeds or percentages. The pressure ranges may represent pressure values detected from applying an input device to a touch screen. The playback speeds or percentages may represent the playback speed or value to be applied to a given pressure range, or an amount/percentage by which a default playback speed is to be decreased (or increased) for a given pressure range. In such examples, mappings may be specified manually or generated automatically using machine learning techniques. The machine learning techniques may calculate optimal or probable ranges for media playback attributes, and/or the most beneficial playback speeds corresponding to those ranges. As another example, playback adjustment engine 208 may compare the user input data to an input speed-based mapping. The input speed-based mapping may comprise a mapping of input speed ranges to playback speeds or percentages. The input speed ranges may represent acceleration values detected from entering input on a touch screen. In such an example, the input speed-based mapping may comprise mappings for various input devices (e.g., a stylus, a finger, etc.), input device types, input device parts, and/or input device dimensions. In yet another example, playback adjustment engine 208 may evaluate the user input data against a directional-input mapping. The directional-input mapping may comprise a mapping of input directions to playback speeds or percentages. For instance, directional-input mapping may specify that a "swipe and hold" left gesture correlates to reducing playback speed by 50%, a "swipe and hold" down gesture correlates to reducing playback speed by 100%, and a "swipe and hold" right gesture correlates to increasing playback speed by 50%. One of skill in the art will appreciate that other types of feedback signals may also be used.

Playback adjustment engine 208 may be further configured to apply adjustments to the playback of media content. In aspects, playback adjustment engine 208 may apply the determined media playback attribute, such as an adjusted playback speed, to the playback of the media content. Applying the determined media playback attribute may comprise setting or modifying one or more default or current media playback settings or configuration files. The playback of the media content may then be modified in accordance with the applied media playback attribute. For example, received user input data may be evaluated to determine the user input data corresponds to a 50% reduction in a media content playback speed. As a result, playback adjustment engine 208 may apply a 0.50 multiplier to the current value of an applicable playback speed setting for the media content. In aspects, when user interaction is no longer detected or user input data is no longer being provided, playback adjustment engine 208 may restore or adjust a media playback attribute to a previous state or value. For example, after 10 seconds of a user editing a video being played back (and reducing the speed of the media playback accordingly), the user may cease editing the video. Input detection engine 206 may detect the cease of user input and may provide an indication of the cessation to playback adjustment engine 208. The indication may be, or include, an ending character (e.g., and end of line or file character, a session break, etc.), a label, a zeroed out data set of media playback attribute values, or the like. In response to identifying the cease of user input, playback adjustment engine 208 may automatically restore the reduced playback speed value to a default playback speed value. As a result, the video may automatically resume playback at a speed consistent with the default playback speed.

Figure 3:
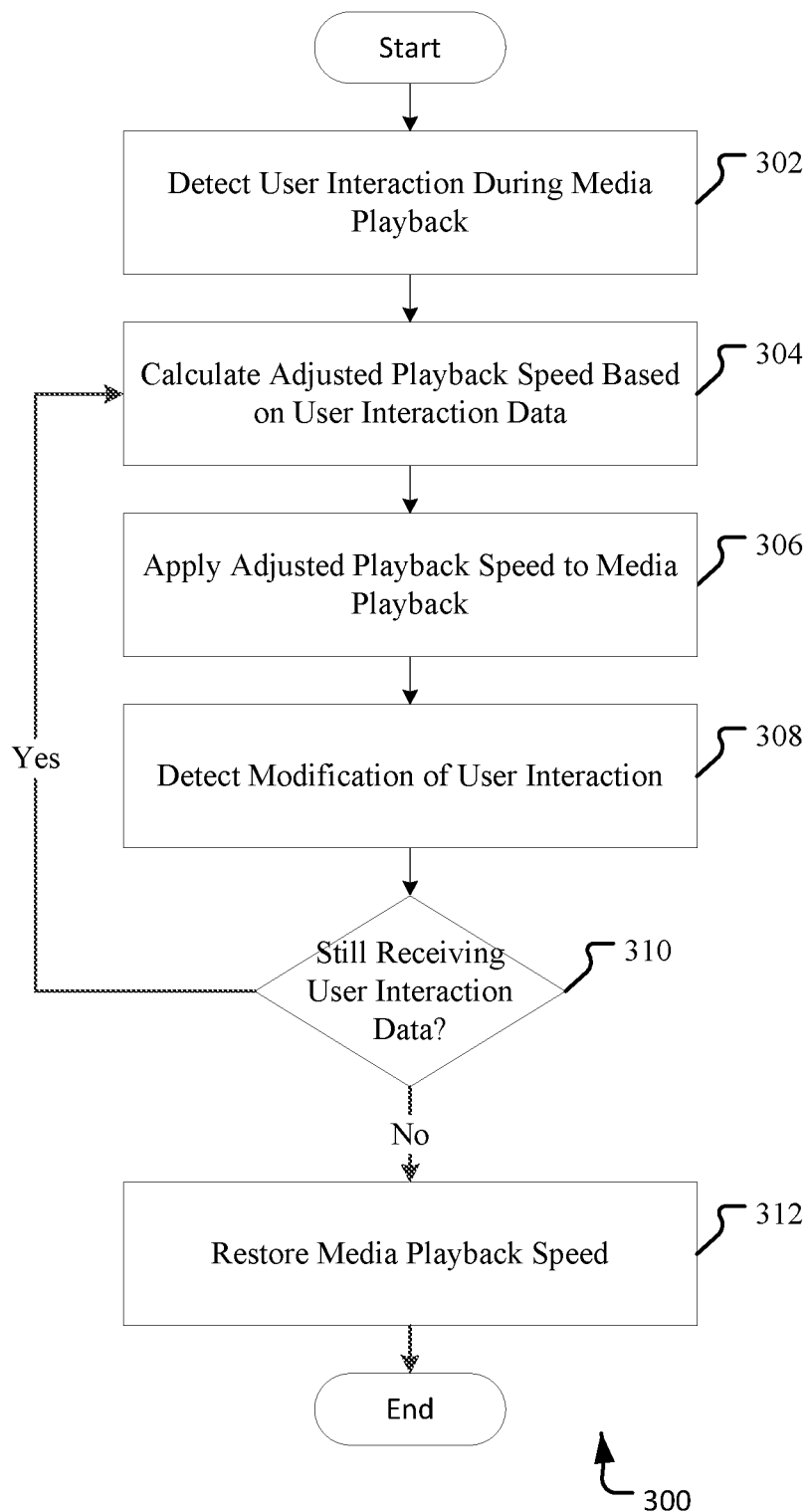
FIG. 3 illustrates an example method of controlling video playback speed using user interaction as described herein

FIG. 3 illustrates an example method of controlling video playback speed using user interaction, as described herein. In aspects, method 300 may be executed by an exemplary system such as system 100 of FIG. 1 or input processing unit 200 of FIG. 2. With respect to FIG. 2, method 300 (or aspects thereof) may be executed by one or more components of FIG. 2. In examples, method 300 may be executed on a device comprising at least one processor configured to store and execute operations, programs or instructions. However, method 300 is not limited to such examples. In other examples, method 300 may be performed on an application or service for controlling video playback speed using user interaction. In at least one example, method 300 may be executed (e.g., computer-implemented operations) by one or more components of a distributed network, such as a web service/distributed network service (e.g. cloud service).

Example method 300 begins at operation 302 where user interaction is detected during the playback of media content. In aspects, a computing device, such as input processing unit 200, may have access to a media playback utility, such as media playback utility 202. The media playback utility may play media content, and provide for the modification of media attributes and/or media playback settings. The media playback utility may additionally provide for interacting with media content as it is played. In examples, an input detection component, such as input detection engine 206, may have access to one or more sensors or sensor devices, such as user interface 204. The playback of the media content may be presented via the sensor device. The sensor device may receive user interaction data during the playback of the media content. The user interaction data may be detected by monitoring one or more input channels, I/O files, and/or event monitors associated with the playback of the media content. The user interaction data may be collected, processed, and stored in one or more data stores. As an example, a media video file may be played on a computing device. The playback speed of the video file may be specified by a default playback speed setting associated with the video file or one or more media file types. The playback of the video file may be displayed on a display screen coupled to (or otherwise accessible to) the computing device. During the playback of the video, user interaction with the video may be detected. The user interaction may correspond to the addition of user content, such as notes and/or drawings, to the video. The user content may be added to the video using an input device, such as a stylus, a mouse, or a user's finger. The added user content may correspond a set of input values relating to one or more input features or characteristics. The set of input values may be collected from one or more data stores, or in real-time from one or more input channels.

At operation 304, an adjusted playback speed may be calculated using the user interaction data. In aspects, a playback adjustment component, such as playback adjustment engine 208, may have access to the user interaction data. The playback adjustment component may provide the user interaction data to one or more logic sets or logic systems. The logics sets/systems may use the user interaction data to calculate or determine adjustments to one or more media attributes or media playback attributes. For example, one or more sets of input values associated with user interaction data may comprise touch-based data. The touch-based data may represent data from any type of touch-based technology, such as resistive touch technology, surface capacitive technology, projected capacitive technology, surface acoustic wave technology, infrared touch technology, etc. As a specific example, the one or more sets of input values may correspond to the pressure applied by a stylus or finger to a display screen. The pressure values may be represented in absolute terms (e.g., 10.5 Newtons), in relative terms (e.g., as normalized values between 0 and 1), or in some combination thereof. The pressure values may be compared to a pressure map comprising a mapping of pressure ranges to playback speeds, playback speed multipliers, or the like. In such an example, a playback speed may represent a label (e.g., very, slow, slow, normal, fast, etc.), a relative value (e.g., "100" for normal speed, "75" for three-quarter speed, etc.), or an actual value (e.g., 60 frames per second (fps)). Based on the pressure map comparison, an adjusted playback speed may be identified and/or selected. For instance, a pressure map may specify that pressure values greater than 10.0 Newtons represent a "hard" press and correlate to a playback speed reduction of 85%; whereas, pressure values between 5.0 and 10.0 represent a "normal" press and correlate to a playback speed reduction of 50%. Such correlations may be a manual determination or may be derived from using machine learning techniques and one or more sets of training data.

At operation 306, an adjusted playback speed may be applied to media playback. In aspects, the determined playback adjustment(s) may be applied to the playback of media content. Applying the determined playback adjustment(s) may include modifying one or more settings, values, and/or configuration files associated with a media player service, such as media playback utility 202. Applying the determined playback adjustment(s) may also include recording and/or storing the previous or default values for the modified settings, values and/or configuration files. The media player service may then play the media content in accordance with the determined playback adjustment(s). For example, a determined playback adjustment may correspond to reducing the playback speed of a currently playing video file to 25% of the current playback speed. As a result, a settings menu for the media player service playing the video file may be accessed. The settings menu may comprise a video playback speed setting that is set to a current or default value. The current/default playback speed value may correspond to the normal playback speed (e.g., 1x speed) of a video file. The current/default playback speed value may be adjusted to correspond to a value that is 25% of the current/default playback speed value. Such an adjustment may include assigning a label, a number or a multiplier to the current/default playback speed value. For instance, the default playback speed value may be set to '100' (representing the normal playback speed). The adjusted playback speed value may be set to '25' to comply with a determined 75% reduction in the default playback speed. The playback of the video file may then continue at 25% of the default playback speed.

At operation 308, a modification of the user interaction data may be detected. In aspects, the input detection component described above may detect a modification to one or more portions of the user interaction data used to perform the playback adjustment. At decision operation 310, a determination may be made as to whether user interaction data is still being received. Such a determination may include evaluating one or more input communication channels, data stores, or sets of input values. For instance, if one or more sets of input values comprise zeros (or another indication of disuse), the input detection component may determine that user interaction with media playback has ceased. If it is determined that user interaction data is still being received, flow may proceed to operation 304, where an adjusted playback speed may be calculated using the modified user interaction data, as described above. If it is determined that user interaction data is not still being received, flow may proceed to operation 312.

At operation 312, default (or previous) media or media playback settings may be restored. In aspects, upon determining that user interaction data is no longer being received, the playback adjustment component may access one or more settings and/or configuration files associated with the media player service. In examples, the settings/configuration files may be the settings/configuration files described with respect to operation 306. The playback setting/configuration values modified in accordance with the determined playback adjustment(s) may be restored to default or previous values. The media player service may then play the media content in accordance with the default/previous playback settings. For example, a user adding content to the playback of a video file may cease providing content after a period of time (e.g., 10 seconds). In response to detecting the cease, a settings menu for the media player service playing the video file may be accessed. The settings menu may comprise a video playback speed setting that is set to an adjusted value. The adjusted playback speed value may correspond to a reduced playback speed (e.g., 0.25× speed) of a video file. The adjusted playback speed value may be adjusted to correspond to a default or previous playback speed value (e.g., 1.0× speed). Such an adjustment may include assigning (or retrieving from storage) a label or a number for the playback speed value, or applying a multiplier to the adjusted playback speed value. The playback of the video file may then automatically continue at the default playback speed.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
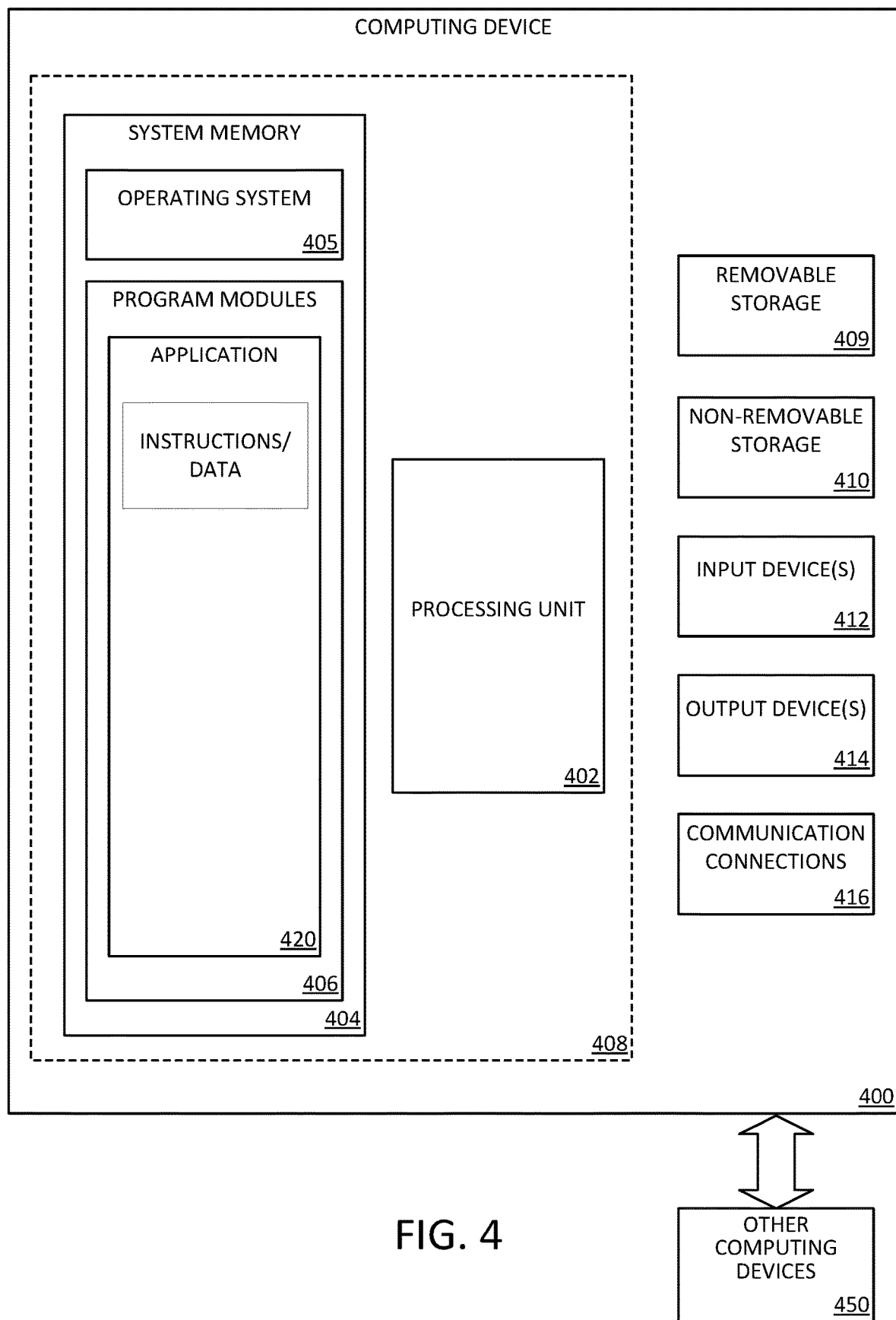
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including the client computing devices 102A-C and the server computing devices 106A-C. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software application 420, such as one or more components supported by the systems described herein. As an example, system memory 404 may store media attributes, media playback attributes, user interaction data, and instructions for controlling video playback speed using user interaction. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
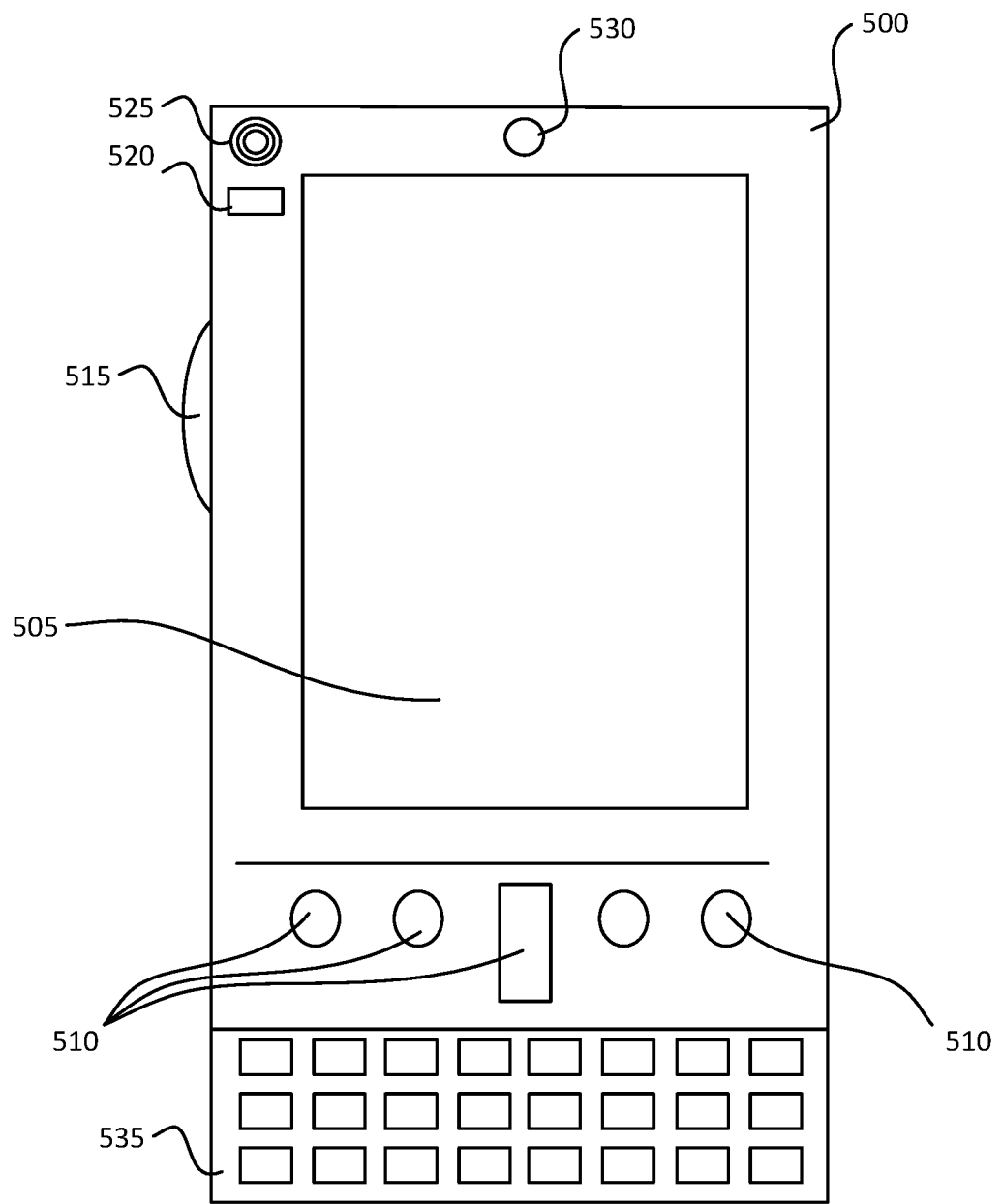
FIGS. 5A and 5B are simplified block diagrams of a mobile computing device with which aspects of the present disclosure may be practiced.
Figure 5B:
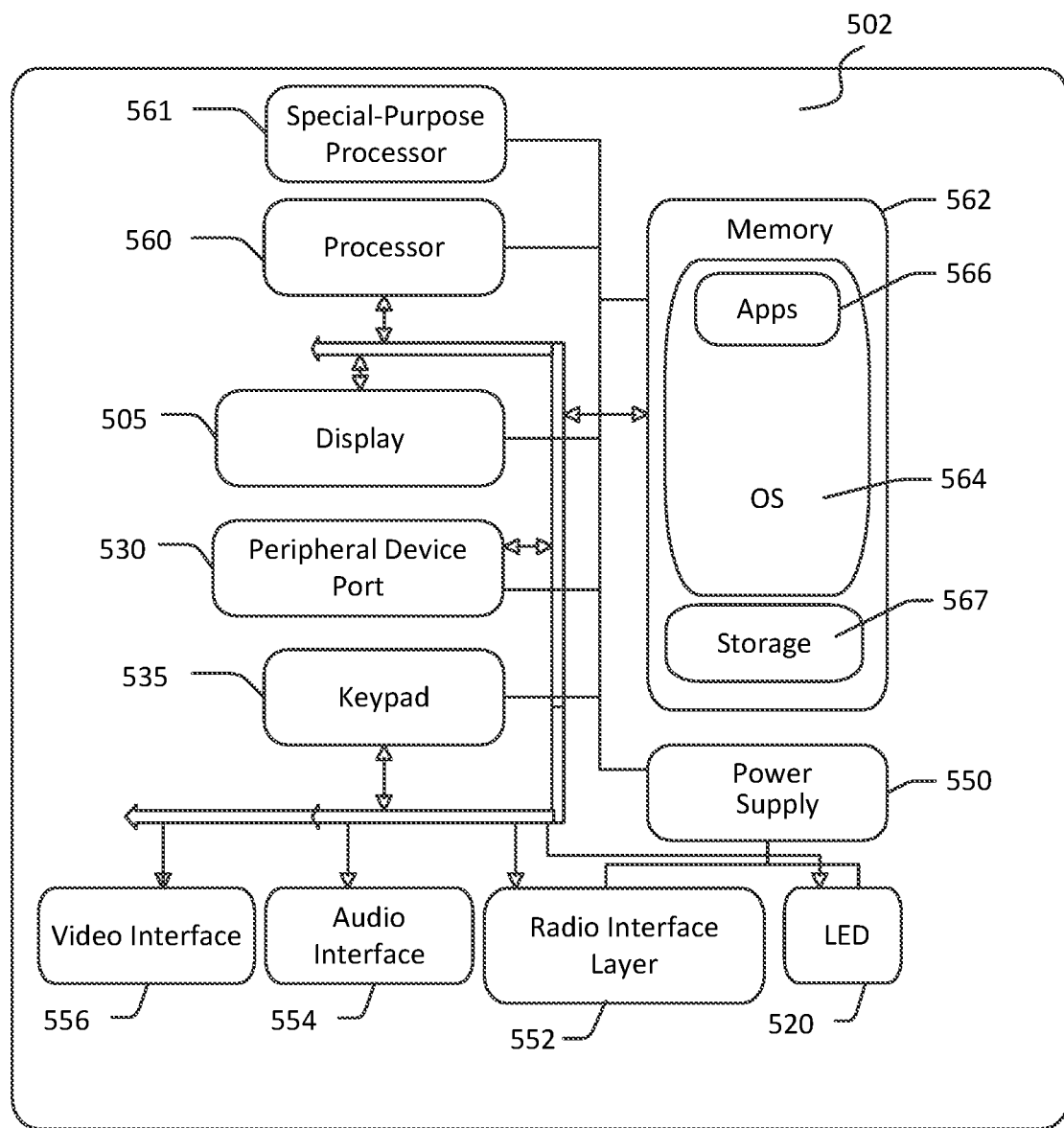

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 567 within the memory 562. The non-volatile storage area 567 may be used to store persistent information that should not be lost if the system 502 is powered down. The application programs 566 may use and store information in the non-volatile storage area 567, such as e-mail or other messages used by an e-mail application, and the like. A synchronization application (not shown) also resides on the system 502 and is programmed to interact with a corresponding synchronization application resident on a host computer to keep the information stored in the non-volatile storage area 567 synchronized with corresponding information stored at the host computer. As should be appreciated, other applications may be loaded into the memory 562 and run on the mobile computing device 500 described herein.

The system 502 has a power supply 550, which may be implemented as one or more batteries. The power supply 550 might further include an external power source, such as an AC adapter or a powered docking cradle that supplements or recharges the batteries.

The system 502 may also include a radio interface layer 552 that performs the function of transmitting and receiving radio frequency communications. The radio interface layer 552 facilitates wireless connectivity between the system 502 and the "outside world," via a communications carrier or service provider. Transmissions to and from the radio interface layer 552 are conducted under control of the operating system 564. In other words, communications received by the radio interface layer 552 may be disseminated to the application programs 566 via the operating system 564, and vice versa.

The visual indicator 520 may be used to provide visual notifications, and/or an audio interface 554 may be used for producing audible notifications via the audio transducer 525. In the illustrated embodiment, the visual indicator 520 is a light emitting diode (LED) and the audio transducer 525 is a speaker. These devices may be directly coupled to the power supply 550 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 554 is used to provide audible signals to and receive audible signals from the user. For example, in addition to being coupled to the audio transducer 525, the audio interface 554 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 556 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 567.

Data/information generated or captured by the mobile computing device 500 and stored via the system 502 may be stored locally on the mobile computing device 500, as described above, or the data may be stored on any number of storage media that may be accessed by the device via the radio interface layer 552 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 552 or via a distributed computing network. Similarly, such data/information may be readily transferred between computing devices for storage and use according to well-known data/information transfer and storage means, including electronic mail and collaborative data/information sharing systems.

Figure 6:
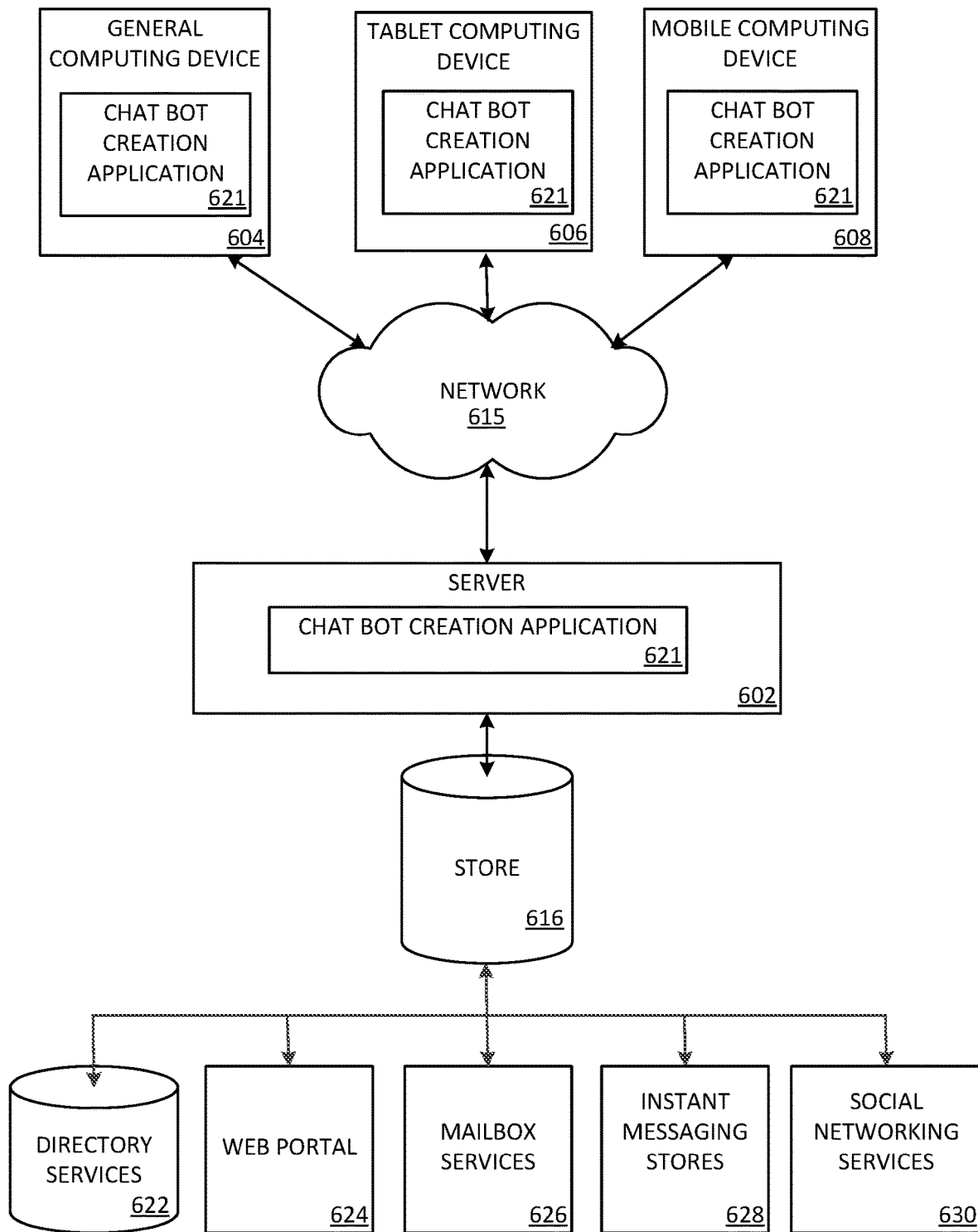
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. A video playback application 621 may be employed by a client that communicates with server device 602, and/or the video playback application 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
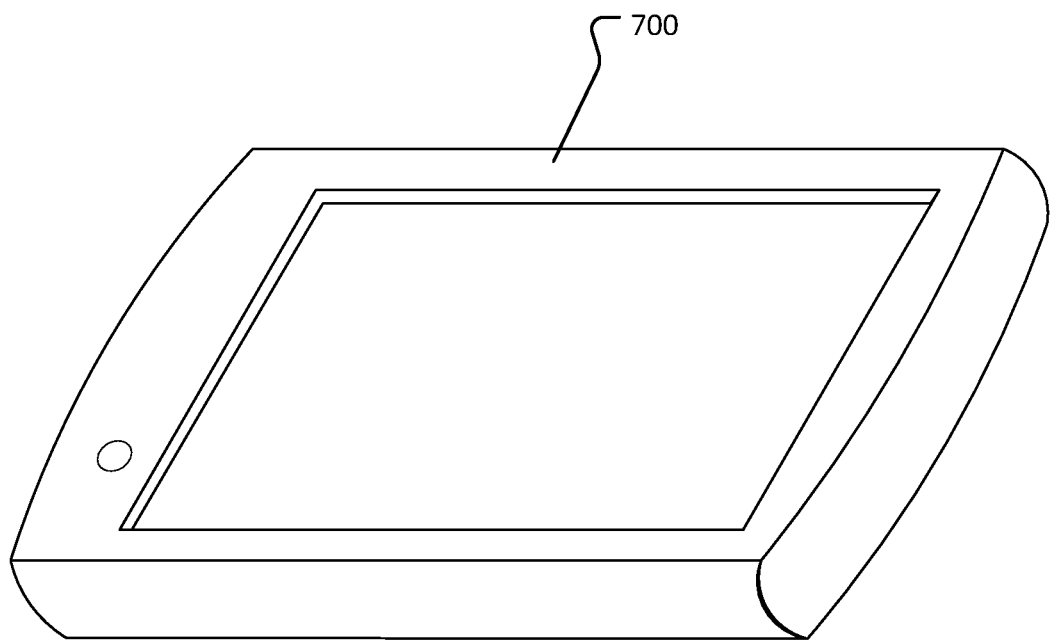
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for controlling video playback speed using user interaction, the method comprising:
      detecting user interaction during playback of media content, wherein the playback is associated with a first playback speed, the user interaction is associated with user interaction data, and the user interaction corresponds to an addition to the media content;
      using the user interaction data to calculate a second playback speed, wherein the calculation is based on at least one of a pressure applied to the media content via a display screen and a speed of input entry;
      applying the second playback speed to the playback of the media content;
      detecting a modification to the user interaction data;
      determining whether the modification relates to ceasing the user interaction; and
      when it is determined that the modification relates to ceasing the user interaction, automatically applying the first playback speed to the playback of the media content.

2. The system of claim 1, wherein the user interaction corresponds to adding content to the playback of the media content using one or more input devices.

3. The system of claim 1, wherein the user interaction data comprises at least one of pressure-related data, acceleration-related data, and directional data.

4. The system of claim 1, wherein the first playback speed corresponds to a default playback speed associated with the playback of the media content.

5. The system of claim 1, wherein calculating the second playback speed comprises providing the user interaction data to one or more logic systems.

6. The system of claim 5, wherein the one or more logic systems evaluates the user interaction data against a mapping of user interaction data to playback speeds.

7. The system of claim 6, wherein the mapping comprises one or more ranges of at least one of pressure data and acceleration data, and corresponding playback speeds.

8. The system of claim 1, wherein the second playback speed is slower than the first playback speed.

9. The system of claim 1, wherein determining whether the modification relates to ceasing the user interaction comprises identifying an indication of the ceasing, the indication comprising at least one of: an ending character, a label, and a zeroed out data set of media playback attribute values.

10. The system of claim 1, the method further comprising, when it is determined that the modification does not relate to ceasing the user interaction:
   automatically calculating a third playback speed based on the modified user interaction data, and
   applying the third playback speed to the playback of the media content.

11. The system of claim 1, wherein the user interaction comprises adding to the media content at least one of notes or drawings.

12. A method for controlling video playback speed using user interaction, the method comprising:
   detecting user interaction during playback of media content, wherein the playback is associated with a first playback speed, the user interaction is associated with user interaction data, and the user interaction corresponds to an addition to the media content;
   using the user interaction data to calculate a second playback speed, wherein the calculation is based on at least one of a pressure applied to the media content via a display screen and a speed of input entry;
   applying the second playback speed to the playback of the media content;
   detecting a modification to the user interaction data;
   determining whether the modification relates to ceasing the user interaction; and
   when it is determined that the modification relates to ceasing the user interaction, automatically applying the first playback speed to the playback of the media content.

13. The method of claim 12, wherein the user interaction corresponds to modifying content in the playback of the media content using one or more input devices.

14. The method of claim 12, wherein the user interaction data comprises data for at least one of: resistive touch technology, surface capacitive technology, projected capacitive technology, surface acoustic wave technology, and infrared touch technology.

15. The method of claim 12, wherein calculating the second playback speed comprises evaluating the user interaction data against a mapping of the user interaction data to corresponding playback speeds.

16. The method of claim 12, wherein the playback of the media content is performed by a media playing utility associated with media playback settings, and wherein the applying the second playback speed comprises modifying one or more settings in the media playback settings.

17. The method of claim 12, further comprising, when it is determined that the modification does not relate to ceasing the user interaction:
   calculating a third playback speed based on the modified user interaction data, and
   applying the third playback speed to the playback of the media content.

18. A computer-readable storage device storing computer executable instructions that when executed cause a computing system to perform a method for controlling video playback speed using user interaction, the method comprising:
   detecting user interaction during playback of media content, wherein the playback is associated with a first playback speed, the user interaction is associated with user interaction data, and the user interaction corresponds to in addition to the media content;
   using the user interaction data to calculate a second playback speed, wherein the calculation is based on at least one of a pressure applied to the media content via a display screen and a speed of input entry;
   applying the second playback speed to the playback of the media content;
   detecting a modification to the user interaction data;
   determining whether the modification relates to ceasing the user interaction; and
   when it is determined that the modification relates to ceasing the user interaction, automatically applying the first playback speed to the playback of the media content.

19. The computer-readable storage device of claim 18, wherein calculating the second playback speed comprises providing the user interaction data to one or more logic systems, wherein the one or more logic systems apply one or algorithms to the user interaction data to determine the second playback speed.

20. The computer-readable storage device of claim 18, wherein detecting the modification to the user interaction data comprises identifying a change to at least one of: input type, input speed, input pressure, input style, and input content.

* * * * *